Figure 1:
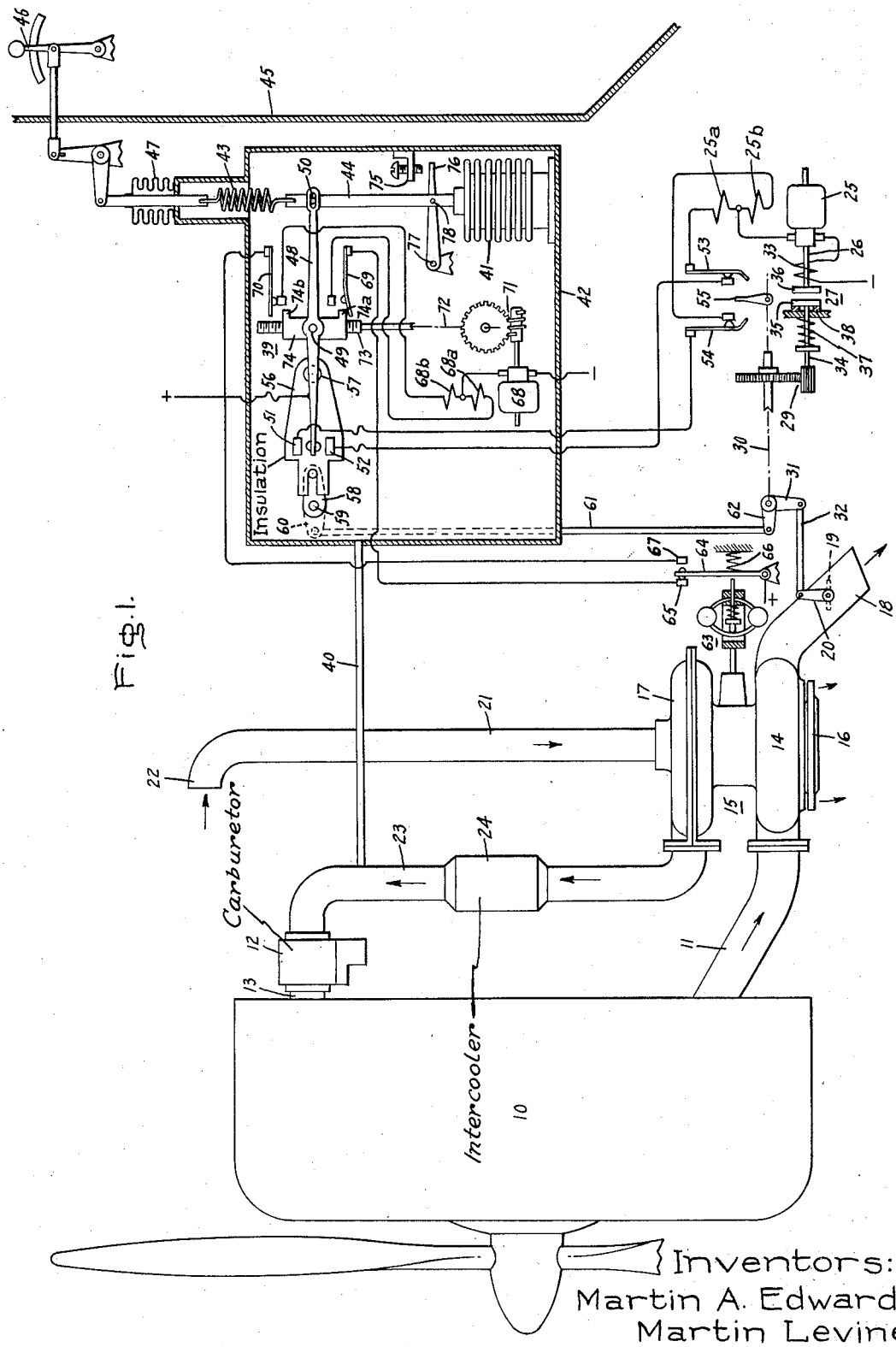

May 15, 1945.   M. A. EDWARDS ET AL   2,376,143
CONTROL SYSTEM FOR AIRCRAFT TURBOSUPERCHARGERS
Filed April 1, 1943   2 Sheets—Sheet 2

Fig. 2.

Inventors:
Martin A. Edwards,
Martin Levine,
by Harry E. Dunham
Their Attorney.

Patented May 15, 1945

2,376,143

UNITED STATES PATENT OFFICE 2,376,143

CONTROL SYSTEM FOR AIRCRAFT TURBOSUPERCHARGERS

Martin A. Edwards, Scotia, and Martin Levine, Schenectady, N. Y., assignors to General Electric Company, a corporation of New York Application April 1, 1943, Serial No. 481,446

12 Claims. (Cl. 230—11)

Our invention relates to a control system for aircraft turbosuperchargers, and especially to control systems for turbosuperchargers wherein the turbosupercharger is operated by exhaust gases fom an aircraft internal combustion engine and the air compressed by the turbosuperchargers is used to supercharge the engine. Specifically, our invention is an improvement on the control system disclosed and claimed in the application of David R. Shoults, Serial No. 452,294, filed July 25, 1942, and assigned to the same assignee as the present application.

An object of our invention is to provide a new and improved control system for turbosuperchargers for aircraft.

Another object of our invention is to provide regulating means for a turbosupercharger which maintains constant a predetermined pressure appurtenant to the operation of the supercharger such, for example, as intake manifold pressure or carburetor intake pressure and, furthermore, to maintain this pressure over a predetermined range of operation with great stability.

Still another object of our invention is to provide new and improved means for regulating a turbosupercharger in which constant carburetor inlet pressure is maintained over a predetermined range of operation, and thereafter substantially constant turbosupercharger speed is maintained.

Further objects and advantages of our invention will become apparent as the following description proceeds, and the features of novelty which characterize our invention will be pointed out with particularity in the claims annexed to and forming a part of this specification.

For a better understanding of our invention, reference may be had to the accompanying drawings in which Fig. 1 is a diagrammatic view of a turbosupercharger control system embodying our invention, and Fig. 2 is a diagrammatic view of a portion of Fig. 1 illustrating a modification of our invention.

Referring now to Fig. 1 of the drawings, 10 indicates an aircraft internal combustion engine having an intake manifold, not shown, and an exhaust manifold, only a portion of which is shown at 11. A carburetor 12 is schematically indicated as having its outlet connected to the intake manifold, not shown, as by means of a conduit 13. Exhaust manifold 11 is connected either directly or through a suitable conduit to the nozzle box 14 of an exhaust gas-driven supercharger generally indicated at 15. The turbine wheel of the supercharger 15 is indicated at 16 and the compressor at 17. Connected with the nozzle box 14 is a waste gate conduit 18 in which is located adjustable valve means or waste gate 19 used in regulating the turbosupercharger. On the shaft of waste gate or valve 19 is fixed an arm 20 for use in positioning the valve.

Connected to the inlet of compressor 17 is an intake conduit 21 for conveying air from the slip stream of the aircraft to the compressor. To this end conduit 21 is connected with a suitable ram 22 which faces into the slip stream of the aircraft. The discharge side of compressor 17 is connected by a conduit 23 to the intake of carburetor 12. If desired, a suitable intercooler, such as is indicated at 24, may be provided in conduit 23 to maintain the temperature of the air entering carburetor 12 within a predetermined range for best airplane performance.

The arrangement so far described is a known one and is to be taken as typical of any turbosupercharger installation. In operation, exhaust gases from the aircraft engine are supplied through exhaust manifold 11 and a suitable conduit, if this is necessary, to the nozzle box 14 from which they are discharged through a ring of nozzles to the turbine wheel 16 of turbosupercharger 15, or through waste conduit 18 directly to the atmosphere. When waste gate 19 is wide open, substantially all the exhaust gases discharge directly to atmosphere, little if any passing through the nozzles to the turbine wheel 16. This represents no load on the supercharger. As waste gate 19 is gradually closed, pressure is built up in nozzle box 14 effecting a gradually increasing flow of exhaust gases through the nozzles to the turbine wheel to operate the supercharger. Maximum load on the supercharger is reached when waste gate 19 is fully closed so that all gases from the engine are discharged against the turbine wheel 16. Ordinarily waste gate 19 is in an intermediate position, part of the exhaust gases being discharged to atmosphere and the remainder passing through the turbine wheel 16.

Our invention has to do particularly with an improved means for regulating waste gate 19.

The position of waste gate 19 may be varied by any suitable means, such for example as a hydraulic piston or the like. However, due to the very low temperatures encountered by high flying aircraft the oil used to operate a piston or similar means is likely to congeal and unsatisfactory operation result. Preferably, therefore, we control the position of waste gate 19 through operation of means comprising an electric motor 25 of the split series field type having field windings 25a and 25b. Upon proper energization of motor 25, it will, as desired, rotate in either direction. The shaft 26 of motor 25 is connected through a suitable clutch brake generally indicated at 27, gearing 29, shaft 30, crank 31 and linkage 32 to arm 20 controlling the position of waste gate 19. The clutch brake 27 which broadly constitutes an electro-magnet comprises an electrical winding 33 which, when energized, produces a magnetic field, causing longitudinal movement of a shaft 34 and a member 35 of magnetic material to engage with a cooperating member 36 of magnetic material on shaft 26 whereupon motor 25 drives gearing 29 and consequently also positions waste gate 19. The members 35, 36 have adjacent friction surfaces whereby upon engagement rotation of one member causes rotation of the other. Upon deenergization of winding 33 a suitable spring means 37 causes shaft 34 to move away from shaft 26 and, furthermore, causes member 35 to engage against a stationary braking member 38, thereby quickly stopping waste gate 19 in the desired position and permitting motor 25 to continue to rotate until its kinetic energy is dissipated. The positioning of waste gate 19 is thereby accurately controlled since the brake portion of clutch brake 27 operates immediately upon deenergization of winding 33.

The operation of motor 25 and, consequently, the position of waste gate 19 may be controlled, as will be obvious from the following description, in response to any pressure appurtenant to an operating condition of the supercharger 15. It has been found desirable to maintain this pressure constant for normal operation of the aircraft. This means that as the aircraft rises the speed of the supercharger must increase to maintain this pressure constant. When a predetermined critical speed is reached it is not feasible to permit further increase in speed of the supercharger to maintain constant the pressure being regulated. Furthermore it has been found desirable to regulate the speed of the supercharger and maintain it constant at the critical speed for altitudes above the so-called "critical altitude" which is the altitude at which the maximum desirable supercharger speed to maintain constant a predetermined pressure is attained. In order to operate motor 25 and solenoid-operated clutch brake 27 so as properly to position waste gate 19 to maintain constant a predetermined pressure appurtenant to an operating condition of the aircraft engine 10 or supercharger 15 up to a certain critical speed and thereafter to maintain constant this critical speed, or at least not permit it to be exceeded, we provide a regulating means generally indicated at 39. Although it should be understood that the pressure to be regulated may be any pressure appurtenant to the operation of supercharger 15, we have chosen by way of example to illustrate our invention as regulating compressor discharge or carburetor inlet pressure. Accordingly the carburetor inlet pressure in conduit 23 is connected by means of a conduit 40 with the pressure responsive means illustrated as a flexible bellows 41 of regulating means 39.

It has been found that at high altitudes in the rarefied atmosphere found there, relays, switching devices and the like may not operate satisfactorily due to severe arcing and the like which arcing would not occur at atmospheric pressures. To eliminate any undesirable arcing of the relays and switching devices of regulating means 39 we have provided a sealed box or housing 42 within which is mounted substantially all of regulating means 39. Conduit 40 is connected to sealed box 42 as indicated so that the pressure in box 42 is carburetor inlet or compressor discharge pressure. The exterior of bellows 41, which is fastened to one of the walls of box 42, is subjected to this pressure and the interior of bellows 41 is evacuated so that movement of bellows 41 will be in response to absolute carburetor inlet or compressor discharge pressure.

The movement of the evacuate bellows 41 is opposed by a tension spring, generally indicated at 43, which is connected to bellows 41 through a connecting link 44. The tension of spring 43 and consequently the pressure to be regulated may be controlled manually from the aircraft cabin 45 by means of a manual control rod 46 which is connected to spring 43 by means entering the sealed box 42 through a suitable stuffing box or the like such as is shown at 47. Any change in the pressure within pressurized box 42 will cause the bellows 41 to expand or contract and move a contact-controlling arm 48 pivotally mounted at 49 and connected to link 44 as indicated at 50. For conditions of equilibrium the tension of spring 43 must be equal to the area of bellows 41 multiplied by the pressure in sealed box 42. This pressure is, as was mentioned above, the quantity to be regulated which has been illustrated by way of example as the carburetor inlet or the compressor discharge pressure. If the pressure in sealed box 42 increases, the force on the bellows area is greater than the tension of spring 43 so that the bellows 41 is compressed. If, on the other hand, the pressure in sealed box 42 decreases, the force on the bellows area is less than the spring tension so that the bellows is extended. This motion of bellows 41 is made to control waste gate 19 in order to correct for pressure changes through the operation of contact-controlling arm 48.

Contact-controlling arm 48 is arranged to engage contacts 51 or 52 which are connected in series with field windings 25b and 25a respectively of waste gate motor 25. The winding 33 of clutch brake 27 has been shown as serially arranged with split field winding 25a and 25b so that whenever either of these field windings is energized, winding 33 is also energized. When contact-controlling member or arm 48 engages contact 51 which is the waste gate opening contact winding 33 of clutch brake 27 and winding 25b of motor 25 are energized. This particular energization will tend to rotate shaft 26 of motor 25 so as to open waste gate 19, thereby decreasing the speed of turbosupercharger 15 and consequently decreasing the pressure in sealed box 42. Similarly, if contact-controlling arm 48 engages waste gate closing contact 52, winding 33 of clutch brake 27 and field winding 25a of motor 25 are energized so that waste gate 19 may be moved to tend to further close waste conduit 18.

In order to prevent overtravel of the waste gate 19, we have provided suitable limit switches serially arranged with the windings 25a and 25b of motor 25 as well as in series with motor 25 and the winding 33 of clutch brake 27. As indicated in the drawings, limit switch 53 is illustrated as connected in series with series field 25a while limit switch 54 is illustrated as connected in series with series field 25b. In order to open limit switch 53 when the waste gate 19 reaches its fully closed position, we provide a member 55 mounted on shaft 30 which engages limit switch 53 and moves it to the open position. Member 55 also moves limit switch 54 to the open position when waste gate 19 reaches its fully open position. Limit switches 53 and 54, therefore, prevent overtravel of waste gate 19 and furthermore control the total waste gate travel. It should be understood that these limit switches which have been illustrated as being arranged outside of pressurized box 42 could equally well be contained within box 42 so as to prevent undesirable arcing at high temperatures.

To stabilize the operation of regulating means 39 we provide an anti-hunting means in the form of a follow-up system which includes a pivotally mounted insulating arm 56 contained within pressurized box 42. Insulating arm 56, which is pivotally mounted at 57, is illustrated as suitably supporting contacts 51 and 52 which, as was mentioned above, may be adjustably mounted thereon. Member 56, pivotally mounted at 57, is moved in response to waste gate position by any means such as a crank or the like. As illustrated in the drawings, this means comprises a crank 58 mounted on a shaft 59 which in turn is operated by a crank 60 connected to shaft 30 which positions waste gate 19 by means of an operating rod 61 and a crank 62. It will be obvious that with this arrangement a follow-up mechanism is provided which is operated in response to the waste gate position. The movement of the contacts 51 and 52 between full open and full closed positions of the waste gate valve determines the amount of droop in the regulator while the distance between contacts 51 and 52 determines the sensitivity of the regulator. This follow-up mechanism causes a permanent recalibration of pressure with altitude, the magnitude of which depends upon the waste gate motion and the total amount of droop required for stability.

When the aircraft attains the critical altitude, which may be in the neighborhood of 25,000 feet, the speed of supercharger 15 has increased to a value above which it is not feasible to operate it for other than very short periods of time. It is, therefore, desirable to provide means for preventing the speed of the supercharger from exceeding this so-called critical speed, and therefore for altitudes above the critical altitude of supercharger 15 we have provided means for regulating the supercharger to maintain substantially constant speed. To this end we provide a suitable centrifugal governor generally indicated at 63 which may be suitably driven from the supercharger so as to be responsive to the speed of the supercharger. Governor 63 is adapted to move a contact-controlling arm 64 which is normally biased against a stationary contact 65 as by means of a spring 66. As the speed of the supercharger reaches the critical speed, governor 63 will move contact-controlling arm 64 away from contact 65 and as this speed increases contact-controlling arm 64 engages a contact 67. Contacts 65 and 67 are connected in a control circuit which will be described hereinafter for controlling contact-controlling arm 48 to maintain constant the speed of the supercharger above the critical altitude of the aircraft.

In order to utilize the opening and closing of contacts 65 and 67 to maintain constant the speed of supercharger 15 above the critical speed by controlling contact-controlling arm 48 in a manner similar to the control exercised on arm 48 by bellows 41 at altitudes below the critical altitude, we provide a restoring motor 68 of the direct current split series field type having field windings 68a and 68b respectively. Contact 65 controlled by governor 63 is connected in series with a limit switch 69 and with field winding 68a of motor 68 as well as in series with the armature of this motor. Similarly, contact 67 is connected in series with a limit switch 70 and in series with a field winding 68b of motor 68 as well as in series with the armature of this motor. Motor 68 is adapted to drive through suitable gearing 71 and shaft 72 a screw 73 for raising and lowering a member 74 which supports the pivot 49 of contact-controlling arm 48. The member 74 is provided with extensions 74a and 74b respectively which are adapted to engage limit switches 69 and 70 in the extreme upper and lower positions, respectively, of member 74. Below the critical altitude of the supercharger, governor 63 is in the position indicated in the drawings and does not engage contact-controlling arm 64 so that spring 66 maintains contact 65 in the closed position, thereby with the member 74 in a position slightly raised from that in the drawings energizing the field winding 68a of series motor 68 through limit switch 69 to move member 74 to its extreme lower position so that limit switch 69 is opened. This is the position indicated in the drawings and below critical altitude pivot 49 is fixed in this position so that contact-controlling arm 48 is controlled solely by bellows 41.

The expansion of bellows 41 is limited by a suitable stop 75 mounted in the sealed or pressurized box 42 which engages with a cooperating stop member 76 pivotally mounted at 77 and connected to link 44 as indicated at 78. When the aircraft goes above the critical altitude, stop member 76 engages stop 75 so that thereafter contact-controlling arm 48 pivots about pivot 50 and is moved upwardly and downwardly by restoring motor 68.

It will be obvious that the follow-up mechanism used for stability operation and described in connection with the pressure-regulating means above operates in exactly the same manner for overspeed control that is above the critical altitude as it does when regulating pressure below the critical altitude. It requires that the restoring motor 68 holds a slightly different speed with the waste gate wide open than it does with the waste gate closed. This should cause no difficulty, however, since the waste gate goes through a very small angle when holding constant the speed of supercharger 15 between the critical altitude and higher altitudes attained by the aircraft.

The operation of the turbosupercharger regulator described will be obvious from the detailed description made above. Assume that the aircraft is in the air and is flying at an altitude lower than the critical altitude of the supercharger, that is, at an altitude below the maximum for which the supercharger 15 is capable of maintaining without excess speed a predetermined pressure on the discharge side of compressor 17, for example sea level pressure. Assume also that at such altitude waste gate 19 is in a partially closed position, as indicated in the drawings, and that the supercharger 15 is operating at a speed such that the desired pressure attains on the discharge side of compressor 17 as well as in pressurized box 42. With this arrangement contact-controlling arm 48 will be controlled in response to the absolute discharge pressure of compressor 17 through operation of bellows 41. If now the operator should move control lever 46 to the right, as indicated in the drawings, thereby increasing the tension on spring 43 and consequently requiring an increase of pressure in box 42 before equalization of forces exerted by spring 43 and bellows 41 is obtained, contact-controlling arm 48 will be moved so as to engage the closing waste gate contact 52 with the consequent energization of field winding 25a of waste gate motor 25 as well as energization of the armature of this motor and also of the winding 33 of clutch brake 27. Such energization will cause shaft 30 to rotate in a direction to close waste gate 19, thereby causing more of the exhaust gases from the aircraft engine 10 to pass through the nozzles of turbine wheel 16 with the consequent increase in speed of supercharger 15 as well as the increase in the discharge pressure of compressor 17. The speed of the supercharger will increase until equilibrium between the forces acting on bellows 41 and the spring force 43 is attained. Movement of the waste gate 19 toward the closed position will also rotate crank 58 in a clockwise direction as viewed in the drawings so as to rotate insulating member 56 downwardly, thereby tending to move contact 52 away from contact-controlling arm 48. If the increase in pressure called for was small, the contact between contact-controlling member 48 and closing waste gate contact 52 would be broken, stopping motor 25 before waste gate 19 is closed too far. If a large increase in pressure were called for, the regulating arm or contact-controlling member 48 would follow closing waste gate contact 52 until the waste gate was completely closed, thus accelerating the supercharger 15 and increasing the compressor discharge pressure at the maximum rate possible. As soon as the desired pressure in box 42 is attained, waste gate motor 25 is deenergized so as to stop waste gate 19 in the proper position to maintain a new pressure in box 42. By properly adjusting regulating means 39, the pressure in sealed box 42 will increase rapidly at first and then slow down just before it reaches the value called for, stopping at this value with no overshooting or undershooting.

When the critical altitude of the supercharger is reached, governor 63 moves arm 64 out of engagement with contact 65. A further increase in supercharger speed will cause governor 63 to move contact-controlling arm 64 into engagement with contact 67, thereupon energizing restoring motor 68 to move member 74 and consequently pivot 49 upwardly so that contact-controlling arm 48 engages opening waste gate contact 51 thereby causing motor 25 to be energized to open waste gate 19 with the consequent reduction in speed of supercharger 15. If the speed of supercharger 15 is reduced too far, governor 63 will be slowed down sufficiently so that spring 66 will move arm 64 into engagement with contact 65, energizing restoring motor 68 so as to move member 74 and consequently pivot 49 downwardly so that contact-controlling arm 48 engages closing waste gate contact 52. The follow-up mechanism comprising pivotally mounted insulating member 56 will prevent overshooting or undershooting of the speed regulating means above the critical altitude.

Although we have disclosed restoring motor 68 as controlling the pivot point 49 of contact-controlling arm 48 while crank 58 operates pivotally mounted insulating member 56, it will be obvious that the follow-up mechanism may include means to move pivot 49 while the restoring motor may control the positions of contacts 51 and 52. Accordingly, in Fig. 2 we have illustrated a portion of the apparatus in Fig. 1 with the corresponding parts designated by the same reference numerals showing a modification of our invention. Contact-controlling arm 48 is illustrated as being pivotally mounted at 49 upon a suitable support 80. Pivot 49 may be moved vertically and is biased in the upper direction as by means of the spring 81. Upon movement of waste gate 19, as was mentioned above, corresponding movement of crank 60 occurs as well as rotation of shaft 59. We have provided a rotatably mounted cam 82 which engages contact-controlling arm 48 so as to move pivot 49 downwardly in response to opening movement of waste gate 19. Spring 81 will of course move pivot 49 upwardly as waste gate 19 is closed and cam 82 is rotated to permit such movement. Cam 82 is rotated by movement of waste gate 19 through operation of a reciprocally mounted rod 83 interconnecting crank 84 on shaft 59 and an extension 82' on cam 82. The screw 73 driven by restoring motor 68 is illustrated as threadedly engaging an insulating member 85 vertically movable in response to rotation of restoring motor 68 between guides 86. Waste gate opening contact 51 and waste gate closing contact 52 are mounted on insulating member 85. It will be obvious that the arrangement in Fig. 2 will operate in exactly the same manner as the regulator of Fig. 1 in so far as maintaining constant the discharge pressure below critical altitude and thereafter maintaining constant the speed of the supercharger.

With the invention described above it is possible to obtain close automatic and stable regulation of the turbo-supercharger with improved apparatus which is simple in construction and reliable in operation.

While we have shown and described particular embodiments of our invention, it will be apparent to those skilled in the art that our invention is not limited to the particular embodiments shown, but that changes and modifications may be made without departing from the spirit and scope of our invention, and we aim in the appended claims to cover all such changes and modifications.

What we claim as new and desire to secure by Letters Patent of the United States is:

1. In combination, a turbosupercharger, valve means for regulating the flow of exhaust gases to the turbine, means including a contact controlling member responsive to a predetermined pressure appurtenant to an operating condition of said supercharger for positioning said valve means to maintain said predetermined pressure at a substantially constant value over a predetermined range of operation, means for taking control of said supercharger away from said last mentioned means outside said range of operation to prevent said supercharger from exceeding a predetermined speed comprising means responsive to the speed of said supercharger, and a motor controlled by said last mentioned means for controlling the positioning of said contact controlling member at speeds above the highest speed within said range of operation.

2. In combination, a turbosupercharger, valve means for regulating the flow of exhaust gases to the turbine, means including a contact controlling member responsive to a predetermined pressure appurtenant to an operating condition of said supercharger for positioning said valve means to maintain said predetermined pressure at a substantially constant value over a predetermined range of operation, means for taking control of said supercharger away from said last mentioned means outside said range of operation to prevent said supercharger from exceeding a predetermined speed, comprising a speed governor driven from said supercharger, and a motor controlled by said governor for controlling the positioning of said contact controlling member at speeds above the highest speed within said range of operation.

3. In combination, a turbosupercharger, valve means for regulating the flow of exhaust gases to the turbine, means including a pivotally mounted contact controlling member responsive to a predetermined pressure appurtenane to an operating condition of said supercharger for positioning said valve means to maintain said predetermined pressure at a substantially constant value over a predetermined range of operation, means for taking control of said supercharger away from said last mentioned means outside said range of operation to prevent said supercharger from exceeding a predetermined speed comprising means responsive to the speed of said supercharger, and a motor controlled by said last mentioned means for controlling the position of the pivot point of said contact controlling member at speeds above the highest speeds within said above mentioned range of operation.

4. In combination, a turbosupercharger, valve means for regulating the flow of exhaust gases to the turbine, means responsive to a predetermined pressure appurtenant to an operating condition of said supercharger for positioning said valve means to maintain said predetermined pressure at a substantially constant value over a predetermined range of operation including a pivotally mounted contact controlling member, means for taking control of said supercharger away from said last mentioned means outside said range of operation to prevent said supercharger from exceeding a predetermined speed comprising a speed governor including an electric control member, means for driving said governor from said supercharger, and a motor controlled by said electric control member for shifting the pivot point of said contact controlling member.

5. In combination, a turbosupercharger, a waste gate for regulating the flow of exhaust gases to the turbine, a motor for positioning said waste gate, means responsive to a predetermined pressure appurtenant to an operating condition of said supercharger for controlling said motor to position said waste gate and maintain said predetermined pressure at a substantially constant value over a predetermined range of operation, including a contact controlling member, means for pivotally mounting said member, a waste gate opening contact adapted to be engaged by said contact controlling member to energize said motor to open said waste gate upon an increase in pressure above said predetermined pressure, a waste gate closing contact adapted to be engaged by said contact controlling member to energize said motor to close said waste gate upon a decrease in pressure below said predetermined pressure, means for taking control of said supercharger away from said first mentioned means outside said range of operation to prevent said supercharger from exceeding a predeterminned speed comprising a speed governor including an electric control member, means for driving said governor from said supercharger, and a restoring motor controlled by said electric control member for moving said means for pivotally mounting said member to cause said contract controlling member to control the waste gate motor.

6. In combination, a turbosupercharger, a waste gate for regulating the flow of exhaust gases to the turbine, a motor for positioning said waste gate, means responsive to the supercharger outlet pressure for controlling said motor to position said waste gate and maintain said outlet pressure at a substantially constant value over a predetermined range of operation, said means including a contact controlling member, means for pivotally mounting said member, a waste gate opening contact adapted to be engaged by said contact controlling member to energize said motor to open said waste gate upon an increase in said carburetor inlet pressure, a waste gate closing contact adapted to be engaged by said contact controlling member to energize said motor to close said waste gate upon a decrease in said outlet pressure, means for taking control of said supercharger away from said first mentioned means outside said range of operation to prevent said supercharger from exceeding a predetermined speed comprising a speed governor including an electric control member, means for driving said governor from said supercharger, and a restoring motor controlled by said electric control member for moving said means for pivotally mounting said member to cause said contact controlling member to control said motor for positioning said waste gate.

7. In combination, a turbosupercharger, a waste gate for regulating the flow of exhaust gases to the turbine, a motor for positioning said waste gate, means responsive to a predetermined pressure appurtenant to an operating condition of said supercharger for controlling said motor to position said waste gate and maintain said predetermined pressure at a substantially constant value over a predetermined range of operation including a contact controlling member, means for pivotally mounting said member, a waste gate opening contact adapted to be engaged by said contact controlling member to energize said motor to open said waste gate upon an increase in pressure above said predetermined pressure, a waste gate closing contact adapted to be engaged by said contact controlling member to energize said motor to close said waste gate upon a decrease in pressure below said predetermined pressure, means for taking control of said supercharger away from said first mentioned means outside said range of operation to prevent said supercharger from exceeding a predetermined speed comprising a speed governor including an electric control member, means for driving said governor from said supercharger, a restoring motor controlled by said electric control member for moving said means for pivotally mounting said member to cause said contact controlling member to control the waste gate motor, and stabilizing means for moving said waste gate closing and opening contacts in response to waste gate position.

8. In combination, a turbosupercharger, a waste gate for regulating the flow of exhaust gases to the turbine, a motor for positioning said waste gate, means responsive to the supercharger discharge pressure for controlling said motor to position said waste gate and maintain said discharge pressure at a substantially constant value over a predetermined range of operation, said means including a contact controlling member, means for pivotally mounting said member, a waste gate opening contact adapted to be engaged by said contact controlling member to energize said motor to open said waste gate upon an increase in said discharge pressure, a waste gate closing contact adapted to be engaged by said contact controlling member to energize said motor to close said waste gate upon a decrease in said carburetor inlet pressure, means for taking control of said supercharger away from said first mentioned means outside said range of operation to prevent said supercharger from exceeding a predetermined speed comprising a speed governor including an electric control member, means for driving said governor from said supercharger, a restoring motor controlled by said electric control member for moving said means for pivotally mounting said member to cause said contact controlling member to control said motor for positioning said waste gate, and stabilizing means for moving said waste gate closing and opening contacts in response to waste gate position.

9. In combination, a turbosupercharger, a waste gate for regulating the flow of exhaust gases to the turbine, a motor for positioning said waste gate, means responsive to the carburetor inlet pressure of said engine for controlling said motor to position said waste gate and maintain said pressure at a substantially constant value over a predetermined range of operation including a contact controlling member, means for pivotally mounting said member, a waste gate opening contact adapted to be engaged by said contact controlling member to energize said motor to open said waste gate upon an increase in said discharge pressure, a waste gate closing contact adapted to be engaged by said contact controlling member to energize said motor to close said waste gate upon a decrease in said discharge pressure, means for taking control of said supercharger away from said first mentioned means outside said range of operation to prevent said supercharger from exceeding a predetermined speed comprising a speed governor including an electric control member, means for driving said governor from said supercharger, and a restoring motor controlled by said electric control member for moving said waste gate opening and closing contacts.

10. In combination, a turbosupercharger, a waste gate for regulating the flow of exhaust gases to the turbine, a motor for positioning said waste gate, means responsive to the supercharger discharge pressure for controlling said motor to position said waste gate and maintain said pressure at a substantially constant value over a predetermined range of operation including a contact controlling member, means for pivotally mounting said member, a waste gate opening contact adapted to be engaged by said contact controlling member to energize said motor to open said waste gate upon an increase in said discharge pressure, a waste gate closing contact adapted to be engaged by said contact controlling member to energize said motor to close said waste gate upon a decrease in said discharge pressure, means for taking control of said supercharger away from said first mentioned means outside said range of operation to prevent said supercharger from exceeding a predetermined speed comprising a speed governor including an electric control member, means for driving said governor from said supercharger, a restoring motor controlled by said electric control member for moving said waste gate opening and closing contacts, and stabilizing means comprising means for moving said means for pivotally mounting said member in response to waste gate position.

11. A control mechanism for turbosuperchargers comprising a control motor, an electric circuit for the motor including a contact controlling member, a variable fulcrum for the member, a pressure responsive device pivotally connected to the member, means cooperatively associated with the device to limit its operating range, and means including a speed governor and electric motor means controlled by the speed governor for varying said fulcrum outside said operating range.

12. A governing mechanism comprising a contact controlling member, a fulcrum supporting the member, a fluid pressure responsive device connected to the member, adjustable means limiting the operating range of the fluid responsive device, and other means for actuating said member outside the operating range of the fluid responsive device, said other means comprising a motor for positioning said fulcrum and a speed responsive device for controlling the motor.

MARTIN A. EDWARDS.
MARTIN LEVINE.